United States Patent [19]

Schrott et al.

[11] Patent Number: 5,071,588

[45] Date of Patent: Dec. 10, 1991

[54] LIQUID-CRYSTALLINE MIXTURE CONTAINING AN AZULENESQUARIC ACID DYE

[75] Inventors: Wolfgang Schrott; Karin H. Beck, both of Ludwigshafen; Karl-Heinz Etzbach, Frankenthal; Peter Neumann, Mannheim, all of Fed. Rep. of Germany

[73] Assignee: BASF Aktiengesellschaft, Ludwigshafen, Fed. Rep. of Germany

[21] Appl. No.: 404,342

[22] Filed: Sep. 7, 1989

[30] Foreign Application Priority Data

Sep. 23, 1988 [DE] Fed. Rep. of Germany ....... 3832311

[51] Int. Cl.[5] ..................... C09K 11/00; C09K 11/52
[52] U.S. Cl. ..................... 252/299.1; 252/299.01
[58] Field of Search ............ 252/299.01; 350/349, 350/350 R, 350 S, 351

[56] References Cited

FOREIGN PATENT DOCUMENTS

| | | |
|---|---|---|
| 0187015 | 7/1986 | European Pat. Off. . |
| 0196919 | 10/1986 | European Pat. Off. . |
| 0310080 | 4/1989 | European Pat. Off. . |
| 3415638 | 10/1984 | Fed. Rep. of Germany . |
| 3816068 | 11/1989 | Fed. Rep. of Germany . |
| 3816187 | 11/1989 | Fed. Rep. of Germany . |
| 62-124987 | 6/1987 | Japan . |
| 2140023 | 11/1984 | United Kingdom . |

OTHER PUBLICATIONS

Handbook of Liquid Crystals, pp. 604–626, (1980), Hans Kelker, et al., "Technical Applications".
Mol. Cryst. Liq. Cryst., vol. 55, (1979), 51, Robert J. Cox, "Liquid Crystal Guest–Host Systems", pp. 1–32.
Elektronik, vol. 14, (1982), 66, Lisa Pauls, et al., "Flussigkristallanzeigen-Moglichkeiten und Grenzen", pp. 66–71.
Mol. Cryst. Liq., vol. 156, (1987), 155, pp. 1–2 and 154–167, A. V. Ivashchenko, et al., "Dyes in Liquid Crystals".

*Primary Examiner*—John S. Maples
*Assistant Examiner*—Shean C. Wu
*Attorney, Agent, or Firm*—Oblon, Spivak, McClelland, Maier & Neustadt

[57] ABSTRACT

A liquid-crystalline mixture contains a liquid crystal composition and an azulenesquaric acid dye of the formula

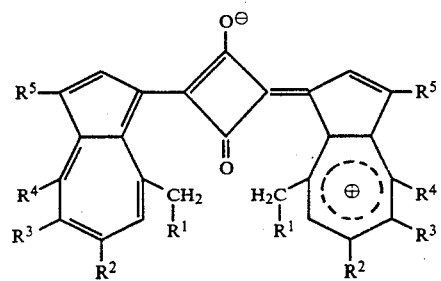

where $R^1$, $R^2$, $R^3$, $R^4$ and $R^5$ each have defined meanings, and is used for fabricating liquid crystal displays.

4 Claims, No Drawings

LIQUID-CRYSTALLINE MIXTURE CONTAINING AN AZULENESQUARIC ACID DYE

BACKGROUND OF THE INVENTION

1. Field of the Invention

The present invention relates to a liquid-crys-talline mixture containing a liquid crystal composition and an azulenesquaric acid dye of the formula I

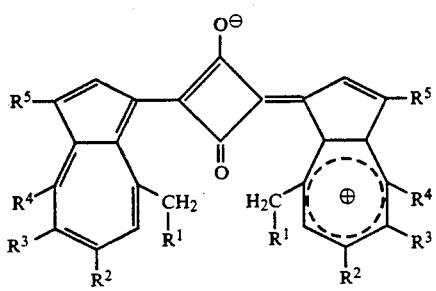

where
$R^1$ is $C_1$-$C_{12}$-alkyl which may be substituted by halogen, amino, hydroxyl, $C_1$-$C_{12}$-alkoxy, phenyl, substituted phenyl, carboxyl, $C_1$-$C_{12}$-alkoxycarbonyl, $C_1$-$C_{12}$-haloalkoxycarbonyl, $C_1$-$C_{12}$-phenylalkoxycarbonyl, cyano, $C_1$-$C_{12}$-alkanoyloxy, benzoyloxy, substituted benzoyloxy and/or the radical

where $R^6$ and $R^7$ are identical or different and are each independently of the other $C_1$-$C_4$-alkyl or phenyl, or is carboxyl, $C_1$-$C_{12}$-alkoxycarbonyl, where the alkyl chain may be interrupted by one or more oxygen atoms, carbamoyl, $C_1$-$C_4$-monoalkylcarbamoyl, $C_1$-$C_4$-dialkylcarbamoyl or the radical

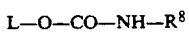

where L is $C_1$-$C_{12}$-alkylene which may be substituted by phenyl and $R^8$ is $C_1$-$C_{20}$-alkyl, $C_5$-$C_7$-cycloalkyl or substituted or unsubstituted phenyl, and $R^2$, $R^3$, $R^4$ and $R^5$ are identical or different and are each independently of the others hydrogen or $C_1$-$C_{12}$-alkyl which may be substituted by halogen, amino, $C_1$-$C_{12}$-alkoxy, phenyl, substituted phenyl, carboxyl, $C_1$-$C_{12}$-alkoxycarbonyl or cyano, with the proviso that when $R^5$ is hydrogen the positions of the substituents $CH_2$-$R^1$ and $R^4$ within an azulene ring can also be interchanged for either or both azulene rings and that $R^1$ is also hydrogen when $R^5$ is methyl or ethyl which may each be substituted by phenyl or substituted phenyl or is $C_3$-$C_{12}$-alkyl, or when at least one of the two radicals $R^2$ and $R^4$ is phenyl or substituted phenyl.

2. Description of the Prior Art

The present invention further relates to the use of the abovementioned liquid-crystalline mixture for fabricating liquid crystal displays.

Liquid-crystalline materials which contain pleochroic dyes are known. Such materials find application in displays. The fundamentals of this subject are described for example in the Handbook of Liquid Crystals, p. 611 ff (1980), Mol. Cryst. Liq. Cryst. 55, (1979), 51, Electronik 14, (1982), 66, and the references cited therein.

Liquid crystal displays (LCDs) are also known. They include the high-resolution static picture LCD wherein laser beams are modulated by a signal, for example a video signal, of a visual image to be repro-duced and are deflected on to a liquid crystal cell in order to write the visual image to be reproduced into it. Thereafter the visual image can be projected onto a screen by irradiation with light.

In such a display, the liquid crystal mixture is normally present in the smectic phase which on irradiation with a laser gives phase transitions into the nematic phase and finally into the isotropic phase.

If the hot part of the liquid crystal following irradation with the laser is quenched following irradiation with the laser, the molecules of this part do not become reoriented but form a disordered texture. This intensively scattering texture is utilized in writing. The process of writing goes hand in hand with the production of this intensively scattering texture in the liquid crystal matrix in the form of spots of small diameter. The added dye brings about better resolution and increases the absorption of light energy. The written image can be erased by reconverting the texture into its original form, ie. the uniformly ordered smectic phase. This is done for example by applying an electric field or by heating.

If such a liquid crystal display, is to be used to store up-to-date images, it is necessary for the rewriting of the static picture to take place rapidly. This in turn requires the efficiency of the temperature transfer to be increased. This is done in general by ensuring optimal absorption of the writing laser beam in the liquid crystal cell.

Consequently, a liquid crystal cell of this kind should contain dyes which
have an absorption maximum in the wavelength range of a semiconductor laser beam, ie. within the range from about 700 to 900 nm,
possess a sufficiently high absorption maximum,
are substantially transmitting in the visible wavelength range,
are soluble in the liquid crystal and
have the property of dichroism.

EP-A-196,919 and DE-A-3,415,638 have already disclosed liquid-crystalline mixtures which contain azulenesquaric acid dyes.

However, it has been found that the dyes described therein are not sufficiently soluble.

SUMMARY OF THE INVENTION

It is an object of the present invention to provide a novel liquid-crystalline mixture which contains an azulenesquaric acid dye and which has advantageous application properties, in particular the above-recited parameters.

We have found that this object is achieved by the liquid-crystalline mixture defined at the beginning.

DESCRIPTION OF THE PREFERRED EMBODIMENTS

All the alkyl and alkylene groups appearing in the azulenesquaric acid dye of the formula I can be not only straight-chain but also branched.

If the azulenesquaric acid dye of the formula I contains substituted phenyl, suitable substituents are for example $C_1$-$C_4$-alkyl, $C_1$-$C_4$-alkoxy, $C_1$-$C_4$-dialkylamino, N-phenyl-N-($C_1$-$C_4$-alkyl)amino and halogen.

If the azulenesquaric acid dye of the formula I contains oxygen-interrupted alkyl, the number of oxygen atoms is preferably from 1 to 3.

Halogen is preferably either fluorine, chlorine or bromine.

$R^1$, $R^2$, $R^3$, $R^4$, $R^5$ and $R^8$ in formula I are each for example methyl, ethyl, propyl, isopropyl, butyl, isobutyl, sec-butyl, tert-butyl, pentyl, isopentyl, neopentyl, tert-pentyl, 2-methylbutyl, hexyl, 2-methylpentyl, isohexyl, heptyl, octyl, 2-ethylhexyl, isooctyl, nonyl, isononyl, decyl, isodecyl, undecyl or dodecyl.

$R^1$, $R^2$, $R^3$, $R^4$, $R^5$ and $R^8$ are each further for example fluoromethyl, chloromethyl, difluoromethyl, trifluoromethyl, trichloromethyl, 2-fluoroethyl, 2-chloroethyl, 2-bromoethyl, 1,1,1-trifluoroethyl, heptafluoropropyl, 4-chlorobutyl, 5-fluoropentyl, 6-chlorohexyl, cyanomethyl, 2-cyanoethyl, 3-cyanopropyl, 2-cyanobutyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl; 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 4-ethoxybutyl, 2- or 4-isopropoxybutyl, 5-ethoxypentyl, 6-methoxyhexyl, benzyl, 1-phenylethyl, 2-phenylethyl, 4-chlorobenzyl, 4-methoxybenzyl, 2-(4-methylphenyl)ethyl, carboxymethyl, 2-carboxyethyl, 3-carboxypropyl, 4-carboxybutyl, 5-carboxypentyl, 6-carboxyhexyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonylpentyl, 5-ethoxycarbonylpentyl, 6-methoxycarbonylhexyl, 6-ethoxycarbonylhexyl, 1-methoxycarbonylethyl, 1-ethoxycarbonylethyl, 1-propoxycarbonylethyl, 1-isopropoxycarbonylethyl, 1-butoxycarbonylethyl, 1-isobutoxycarbonylethyl, 1-sec-butoxycarbonylethyl, 1-methoxycarbonylpropyl, 1-ethoxycarbonylpropyl, 1-propoxycarbonylpropyl, 1-isopropoxycarbonylpropyl, 1-butoxycarbonylpropyl, 1-isobutoxycarbonylpropyl, 1-sec-butoxycarbonylpropyl, benzyloxycarbonylmethyl, 2-benzoyloxycarbonylethyl, (2-phenylethoxy)carbonylmethyl, 2-[(2-phenylethoxy)carbonyl]ethyl or 2-(2-bromoethoxycarbonyl)ethyl.

$R^8$ is further for example 4-methylphenyl, 4-methoxyphenyl, 4-chlorophenyl, tridecyl, isotridecyl, tetradecyl, pentadecyl, hexadecyl, heptadecyl, octadecyl, nonadecyl, eicosyl, cyclopentyl, cyclohexyl, cycloheptyl or methylcyclohexyl.

$R^1$ in formula I is further for example 2-hydroxyethyl, 2-hydroxypropyl, 3-hydroxypropyl, 2-hydroxybutyl, 4-hydroxybutyl, 5-hydroxypentyl, 6-hydroxyhexyl, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, neopentyloxycarbonyl, tert-pentyloxycarbonyl, hexyloxycarbonyl, isohexyloxycarbonyl, heptyloxycarbonyl, octyloxycarbonyl, isooctyloxycarbonyl, nonyloxycarbonyl, isononyloxycarbonyl, decyloxycarbonyl, isodecyloxycarbonyl, undecyloxycarbonyl, dodecyloxycarbonyl (the designations isooctyl, isononyl, isodecyl and isotridecyl are trivial names from the alcohols formed by the oxo process—cf. Ullmanns Enzyklopädie der Technischen Chemie, 4th edition, volume 7, pages 215 to 217, and volume 11, pages 435 and 436), 2-methoxyethoxycarbonyl, 2-ethoxyethoxycarbonyl, 3,6-dioxaheptyloxycarbonyl, acetyloxymethyl, 2-acetyloxyethyl, 2-(2,2-dimethylpropionyloxy)ethyl, 2-decanoyloxyethyl, benzoyloxymethyl, 2-benzoyloxyethyl, 2-(3,5-dimethoxy-4-methylbenzovloxy)ethyl, 2-(dimethylphosphinato)ethyl, 2-(diethylphosphinato)ethyl, 2-(methylethylphosphinato)ethyl, 3-ethyl-2-(methylethylphosphinato)propyl, 2-(diphenylphosphinato)ethyl, N-methylcarbamoyl, N-ethylcarbamoyl, N,N-dimethylcarbamoyl or N,N-diethylcarbamoyl.

L is for example methylene, ethylene, 1,2- or 1,3-propylene, 1,2-, 1,3-, 2,3- or 1,4-butylene, pentamethylene, hexamethylene, heptamethylene, octamethylene, nonamethylene, decamethylene, undecamethylene, dodecamethylene, phenylethylene, 1-phenyl-1,2-propylene or 2-phenyl-1,3-propylene.

Preference is given to a liquid-crystalline mixture which contains an azulenesquaric acid dye of the formula I where $R^2$, $R^3$, $R^4$ and $R^5$ are each $C_1$–$C_6$-alkyl and $R^1$ is as defined above.

Particular preference is given to a liquid-crystalline mixture which contains an azulenesquaric acid dye of the formula I where $R^2$ and $R^4$ are each methyl, $R^3$ and $R^5$ are each hydrogen and $R^1$ is as defined above. This dye conforms to the formula Ia

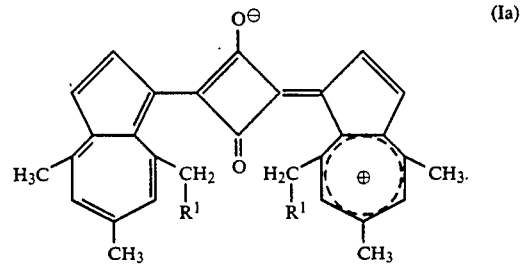

Very particular preference is given to a liquid-crystalline mixture which contains an azulenesquaric acid dye of the formula I where $R^2$ and $R^4$ are each hydrogen, $R^3$ is isopropyl, $R^5$ is methyl and $R^1$ is as defined above. This dye conforms to the formula Ib

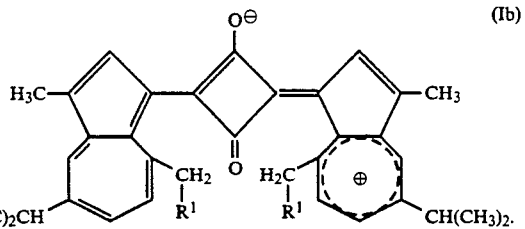

Preference is further given to a liquid-crystalline mixture which contains an azulenesquaric acid dye of the formula I where $R^1$ is $C_1$–$C_{12}$-alkyl which is substituted by $C_1$–$C_{12}$-alkoxycarbonyl. With notice is in particular the liquid-crystalline mixture which contains an azulenesquaric acid dye of the formula I where $R^1$ is $C_1$–$C_{12}$-alkoxycarbonylmethyl.

The azulenesquaric acid dye of the formula I and the preparation thereof are known per se and described for example in earlier European Patent Application EP-A-310,080 and earlier German Patent Applications P 38 16 068.4 and P 38 16 187.7.

The liquid crystal composition on which the liquid-crystalline mixture according to the invention is based is likewise a conventional substance as described for example in Mol. Cryst. Liq. Cryst. 156 (1987), 155.

It is in general a substance which has nematic, cholesteric and/or smectic phases It belongs for example to the class of Schiff bases, biphenyls, phenylcyclohexanes, cyclohexylcyclohexanes, terphenyls, cyclohexylbiphenyls, cyclohexylbiphenylcyclohexanes, pyrimidines, dioxanes, cinnamic esters, cholesteric esters, p-alkylbenzoic esters, phenylcyclohexylcarboxylic esters, cyclohexylcyclohexylbenzoic esters, cyclohexylphenylcyclohexylcarboxylic esters or the cyclohexylcyclohexylcyclohexylcarboxylic esters.

Such a liquid crystal composition is commercially available and generally takes the form of a mixture of various mesogenic components.

The liquid-crystalline mixture according to the invention contains in general from 0.01 to 20% by weight, preferably from 0.05 to 10% by weight, in particular from 0.05 to 5% by weight, each percentage being based on the total weight of the liquid-crystalline mixture, of one or more azulenesquaric acid dyes of the formula I.

It is obtained in a conventional manner, for example by mixing dyes and liquid crystal composition with or without heating Owing to the unexpectedly high solubility of the azulenesquaric acid dyes in the liquid crystal composition and the good order parameter, the novel liquid-crystalline mixture is advantageously suitable for fabricating liquid crystal displays where thermowriting is effected by irradiation with a laser beam.

The absorption maxima of the azulenesquaric acid dyes are within the range from about 700 to 900 nm, ie. at the oscillating wavelength of the writing laser beam, and these dyes also effect high absorption of the writing laser beam energy.

The Examples which follow will illustrate the invention in more detail.

The azulenesquaric acid dyes Nos. 1 to 59 mentioned in Table 1 were used for preparing a liquid-crystalline mixture.

TABLE I

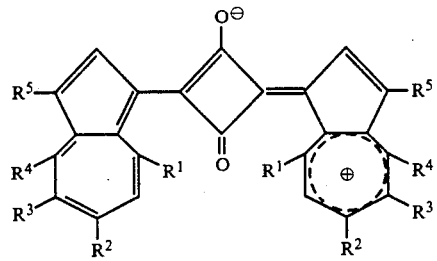

| Example No. | $R^1$ | $R^2$ | $R^3$ | $R^4$ | $R^5$ |
|---|---|---|---|---|---|
| 1 | $(CH_2)_2CO_2CH_3$ | H | $CH(CH_3)_2$ | H | $CH_3$ |
| 2 | $(CH_2)_2CO_2C_2H_5$ | H | $CH(CH_3)_2$ | H | $CH_3$ |
| 3 | $(CH_2)_2CO_2nC_3H_7$ | H | $CH(CH_3)_2$ | H | $CH_3$ |
| 4 | $(CH_2)_2CO_2iC_3H_7$ | H | $CH(CH_3)_2$ | H | $CH_3$ |
| 5 | $(CH_2)_2CO_2nC_4H_9$ | H | $CH(CH_3)_2$ | H | $CH_3$ |
| 6 | $(CH_2)_2CO_2sC_4H_9$ | H | $CH(CH_3)_2$ | H | $CH_3$ |
| 7 | $(CH_2)_2CO_2nC_8H_{17}$ | H | $CH(CH_3)_2$ | H | $CH_3$ |
| 8 | $(CH_2)_3CO_2CH_3$ | H | $CH(CH_3)_2$ | H | $CH_3$ |
| 9 | $(CH_2)_3CO_2iC_3H_7$ | H | $CH(CH_3)_2$ | H | $CH_3$ |
| 10 | $(CH_2)_3CO_2nC_4H_9$ | H | $CH(CH_3)_2$ | H | $CH_3$ |
| 11 | $(CH_2)_2CO_2CH_2\text{—Ph}$ | H | $CH(CH_3)_2$ | H | $CH_3$ |
| 12 | $(CH_2)_2CO_2CH_2CH_2Br$ | H | $CH(CH_3)_2$ | H | $CH_3$ |
| 13 | $CH_2\text{—}CH(CH_3)CO_2CH_3$ | H | $CH(CH_3)_2$ | H | $CH_3$ |
| 14 | $CH_2\text{—}CH(CH_3)CO_2nC_4H_9$ | H | $CH(CH_3)_2$ | H | $CH_3$ |
| 15 | $CH_2\text{—}CH(C_2H_5)CO_2CH_3$ | H | $CH(CH_3)_2$ | H | $CH_3$ |
| 16 | $CH_2\text{—}CH(C_2H_5)CO_2C_2H_5$ | H | $CH(CH_3)_2$ | H | $CH_3$ |
| 17 | $CH_2\text{—}CH(C_2H_5)CO_2iC_3H_7$ | H | $CH(CH_3)_2$ | H | $CH_3$ |

TABLE I-continued

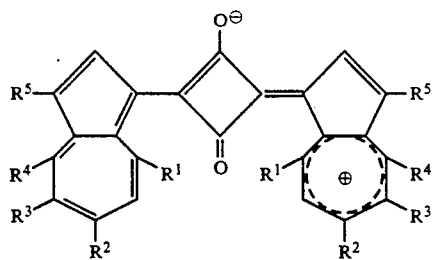

| Example No. | R¹ | R² | R³ | R⁴ | R⁵ |
|---|---|---|---|---|---|
| 18 | CH₂—CH(C₂H₅)CO₂C₄H₉ | H | CH(CH₃)₂ | H | CH₃ |
| 19 | CH₂—CH(C₆H₅)CO₂C₂H₅ | H | CH(CH₃)₂ | H | CH₃ |
| 20 | (CH₂)₂OC(O)CH₃ | H | CH(CH₃)₂ | H | CH₃ |
| 21 | (CH₂)₃OC(O)CH₃ | H | CH(CH₃)₂ | H | CH₃ |
| 22 | (CH₂)₃OC(O)C(CH₃)₃ | H | CH(CH₃)₂ | H | CH₃ |
| 23 | (CH₂)₃OC(O)C₉H₁₉ | H | CH(CH₃)₂ | H | CH₃ |
| 24 | (CH₂)₂OC(O)C₆H₅ | H | CH(CH₃)₂ | H | CH₃ |
| 25 | (CH₂)₃OC(O)C₆H₅ | H | CH(CH₃)₂ | H | CH₃ |
| 26 | (CH₂)₃OC(O)-3,4,5-(OCH₃)₃C₆H₂ | H | CH(CH₃)₂ | H | CH₃ |
| 27 | (CH₂)₃OC(O)NH—C₆H₅ | H | CH(CH₃)₂ | H | CH₃ |
| 28 | (CH₂)₃OC(O)NH—C₄H₉ | H | CH(CH₃)₂ | H | CH₃ |
| 29 | CH₂CH(CH₃)CH₂OC(O)NH—C₄H₉ | H | CH(CH₃)₂ | H | CH₃ |
| 30 | CH₂CH(C₆H₅)CH₂OC(O)NH—C₄H₉ | H | CH(CH₃)₂ | H | CH₃ |
| 31 | (CH₂)₃OP(O)(C₆H₅)₂ | H | CH(CH₃)₂ | H | CH₃ |
| 32 | (CH₂)₃OCH₃ | H | CH₃ | H | CH₃ |
| 33 | (CH₂)₂C₆H₅ | H | CH₃ | H | CH₃ |
| 34 | CH₂CO₂CH₃ | CH₃ | H | CH₃ | H |
| 35 | CH₂CO₂C₂H₅ | CH₃ | H | CH₃ | H |
| 36 | CH₂CO₂nC₃H₇ | CH₃ | H | CH₃ | H |
| 37 | CH₂CO₂iC₃H₇ | CH₃ | H | CH₃ | H |
| 38 | CH₂CO₂nC₄H₉ | CH₃ | H | CH₃ | H |
| 39 | (CH₂)₂CO₂CH₃ | CH₃ | H | CH₃ | H |
| 40 | (CH₂)₂CO₂C₂H₅ | CH₃ | H | CH₃ | H |
| 41 | (CH₂)₂CO₂nC₃H₇ | CH₃ | H | CH₃ | H |
| 42 | (CH₂)₂CO₂iC₃H₇ | CH₃ | H | CH₃ | H |
| 43 | (CH₂)₂CO₂nC₄H₉ | CH₃ | H | CH₃ | H |
| 44 | (CH₂)₃CO₂nC₄H₉ | CH₃ | H | CH₃ | H |
| 45 | CH₃ | CH₃ | H | CH₃ | H |
| 46 | CH₃ | CH₃ | H | CH₃ | CH(CH₃)₂ |

TABLE I-continued

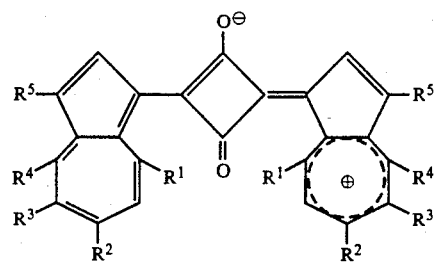

| Example No. | R¹ | R² | R³ | R⁴ | R⁵ |
|---|---|---|---|---|---|
| 47 | $CH_3$ | $CH_3$ | H | $CH_3$ | $CH(CH_3)C_8H_{17}$ |
| 48 | $CH_3$ | $CH_3$ | H | $CH_3$ | $CH(CH_3)C_{12}H_{25}$ |
| 49 | $CH_3$ | $CH_3$ | H | $CH_3$ | $CH_2$–C₆H₅ |
| 50 | $CH_3$ | $CH_3$ | H | $CH_3$ | $CH(CH_3)$–C₆H₅ |
| 51 | $CH_3$ | $CH_3$ | H | $CH_3$ | $CH(CH_3)$–C₆H₄–$C(CH_3)_3$ |
| 52 | $CH_3$ | $CH_3$ | H | $CH_3$ | $CH_2$–C₆H₄–$OCH_3$ |
| 53 | $CH_3$ | $CH_3$ | H | $CH_3$ | $CH(CH_3)$–C₆H₄–$OCH_3$ |
| 54 | $CH_3$ | $CH_3$ | H | $CH_3$ | $CH_2$–C₆H₄–$N(CH_3)_3$ |
| 55 | $CH_3$ | $CH_3$ | H | $CH_3$ | $CH_2$–C₆H₄–$N(CH_3)(C_6H_5)$ |
| 56 | $CH_3$ | $CH_3$ | H | $CH_3$ | $CH_2$–C₆H₄–$N(CH_3)_3$ |
| 57 | $CH_3$ | $CH_3$ | H | $CH_3$ | $CH_2$–C₆H₄–F |

TABLE I-continued

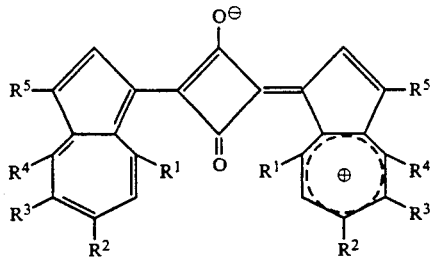

| Example No. | R¹ | R² | R³ | R⁴ | R⁵ |
|---|---|---|---|---|---|
| 58 | CH₃ | —⟨phenyl⟩—OCH₃ | H | CH₃ | H |
| 59 | CH₃ | —⟨phenyl⟩—OCH₃ | H | —⟨phenyl⟩—OCH₃ | H |

The liquid-crystalline mixture 1which contains a dye No. 1-59 was prepared by dissolving the particular dye in a liquid crystal. To this end, 50 mg of the dye were stirred into 1 ml of liquid crystal of type ZLI from Merck at room temperature in the course of 1 week, and the saturated solution was then centrifuged to remove the residue.

Thereafter the order parameter and the solubility of each dye was determined in the liquid-crystalline system. The measurements for this purpose were carried out with a U 3500 spectrophotometer from Hitachi.

The order parameter S here was determined at room temperature on the abovementioned solution in a commercial measuring cell with homogeneous edge orientation (polyimide, layer thickness 10-20 μm) in accordance with the known equation $$S = \frac{CR - 1}{CR + 2}$$

where the dichroic ratio CR was determined in accordance with the relationship $$CR = \frac{E^{\parallel}}{E^{\perp}}$$

by measuring the absorbance A" (measurement with light polarized parallel to the director of the nematic phase) and A (measurement with light polarized perpendicular to the director of the nematic phase), the dye concentration having been chosen in such a way that A" was within the range from 1 to 2.

The solubility was determined by comparing the absorbance of the saturated solution of the liquid-crystalline mixture with that of a solution of a known concentration of the particular dye in methylene chloride.

Table 2 below lists for each compound Nos. 1 to 59 of Table 1: the order parameter S, the solubility L, the absorption maximum, measured in methylene chloride as solvent, and the melting point.

TABLE 2

| Example No. | Order parameter S | Solubility L | λ max [nm] | Melting point [°C.] |
|---|---|---|---|---|
| 1 | 0,55 | 0,26 | 767 | 175-77 |
| 2 | 0,55 | 0,35 | 767 | 138-40 |
| 3 | 0,55 | 0,41 | 767 | 144-46 |
| 4 | 0,57 | 0,22 | 769 | 126-27 |
| 5 | 0,55 | 0,46 | 767 | 105-07 |
| 6 | 0,56 | 0,28 | 767 | 108-10 |
| 7 | 0,55 | 0,49 | 768 | [oil] |
| 8 | 0,55 | 0,26 | 767 | ca. 100 |
| 9 | 0,57 | 0,22 | 767 | >100 |
| 10 | 0,55 | 0,46 | 768 | 144-45 |
| 11 | 0,57 | 0,22 | 767 | [oil] |
| 12 | 0,55 | 0,35 | 767 | 130-32 |
| 13 | 0,57 | 0,49 | 768 | 220-21 |
| 14 | 0,56 | 0,46 | 770 | 172-73 |
| 15 | 0,54 | 0,35 | 768 | 196-97 |
| 16 | 0,55 | 0,22 | 770 | 185-87 |
| 17 | 0,56 | 0,26 | 771 | 180-80 |
| 18 | 0,60 | 0,15 | 770 | 151-52 |
| 19 | 0,52 | 0,22 | 768 | 215-17 |
| 20 | 0,55 | 0,27 | 765 | [oil] |
| 21 | 0,55 | 0,29 | 765 | [oil] |
| 22 | 0,53 | 0,22 | 768 | >80 |
| 23 | 0,58 | 0,49 | 765 | [oil] |
| 24 | 0,54 | 0,26 | 765 | |
| 25 | 0,55 | 0,28 | 768 | 230-32 |
| 26 | 0,48 | 0,21 | 767 | 183-85 |
| 27 | 0,54 | 0,11 | 770 | 257-58 |
| 28 | 0,55 | 0,47 | 770 | 155-56 |
| 29 | 0,58 | 5,6 | 773 | 185-87 |
| 30 | 0,35 | 0,45 | 774 | 102 |
| 31 | 0,28 | 0,40 | 769 | 208-09 |
| 32 | 0,30 | 0,50 | 763 | [oil] |
| 33 | 0,42 | 0,50 | 769 | 219-25 |
| 34 | 0,63 | 1,00 | 724 | 180-205 |
| 35 | 0,63 | 1,74 | 723 | 155-62 |
| 36 | 0,63 | 2,42 | 721 | [oil] |
| 37 | 0,64 | 1,15 | 723 | 136-40 |
| 38 | 0,63 | 1,90 | 725 | [oil] |
| 39 | 0,63 | 1,26 | 723 | [oil] |
| 40 | 0,63 | 1,74 | 722 | 65-69 |
| 41 | 0,63 | 2,45 | 722 | 140-42 |
| 42 | 0,65 | 1,00 | 723 | 176-77 |
| 43 | 0,63 | 1,90 | 723 | [oil] |
| 44 | 0,63 | 1,74 | 726 | [oil] |
| 45 | 0,30 | 0,42 | 716 | >300 |
| 46 | 0,35 | 0,38 | 744 | ca. 255 |
| 47 | 0,30 | 0,37 | 756 | 177-79 |
| 48 | 0,30 | 0,40 | 757 | 145-48 |
| 49 | 0,28 | 0,35 | 739 | |

TABLE 2-continued

| Example No. | Order parameter S | Solubility L | λ max [nm] | Melting point [°C.] |
|---|---|---|---|---|
| 50 | 0,27 | 0,38 | 746 | |
| 51 | 0,35 | 0,40 | 746 | |
| 52 | 0,30 | 0,42 | 749 | |
| 53 | 0,28 | 0,40 | 723 | ca. 280 |
| 54 | 0,45 | 0,43 | 739 | 230-32 |
| 55 | 0,44 | 0,50 | 734 | >160 |
| 56 | 0,46 | 0,55 | 749 | 277-79 |
| 57 | 0,50 | 0,50 | 747 | 230-31 |
| 58 | 0,35 | 0,30 | 728 | 268 |
| 59 | 0,28 | 0,25 | 746 | 237 |

We claim:

1. A liquid-crystalline mixture containing a liquid crystal composition and an azulenesquaric acid dye of the formula (I)

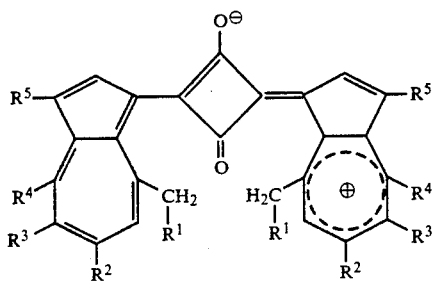

where $R^1$ is $C_1$-$C_{12}$-alkyl which is substituted by halogen, amino, hydroxyl, $C_1$-$C_{12}$-alkoxy, phenyl, substituted phenyl, carboxyl, $C_1$-$C_{12}$-alkoxycarbonyl, $C_1$-$C_{12}$-haloalkoxycarbonyl, $C_1$-$C_{12}$-phenylalkoxycarbonyl, cyano, $C_1$-$C_{12}$-alkanoyloxy, benzoyloxy, substituted benzoyloxy and/or the radical

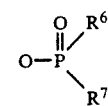

where $R^6$ and $R^7$ are identical or different and are each independently of the other $C_1$-$C_4$-alkyl or phenyl; carboxyl; $C_1$-$C_{12}$-alkoxycarbonyl, where the alkyl chain may be interrupted by one or more oxygen atoms; carbamoyl; $C_1$-$C_4$-monoalkylcarbamoyl; $C_1$-$C_4$-dialkylcarbamoyl or the radical

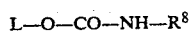

L—O—CO—NH—$R^8$ where L is $C_1$-$C_{12}$-alkylene which may be substituted by phenyl and $R^8$ is $C_1$-$C_{20}$-alkyl, $C_5$-$C_7$-cycloalkyl or substituted or unsubstituted phenyl; and $R^2$, $R^3$, $R^4$ and $R^5$ are identical or different and are each independently of the others hydrogen; or $C_1$-$C_{12}$-alkyl, which may be substituted by halogen, amino, $C_1$-$C_{12}$-alkoxy, phenyl, substituted phenyl, carboxyl, $C_1$-$C_{12}$-alkoxycarbonyl or cyano;

with the proviso that, when $R^5$ is hydrogen, the positions of the substituents CH$_2$-$R^1$ and $R^4$ within an azulene ring can also be interchanged for either or both azulene rings.

2. A liquid-crystalline mixture as claimed in claim 1, wherein $R^2$, $R^3$, $R^4$ and $R^5$ are each $C_1$-$C_6$-alkyl.

3. A liquid-crystalline mixture as claimed in claim 1, wherein $R^2$ and $R^4$ are each methyl, and $R^3$ and $R^5$ are each hydrogen.

4. A liquid-crystalline mixture as claimed in claim 1, wherein $R^2$ and $R^4$ are each hydrogen, $R^3$ is isopropyl and $R^5$ is methyl.

* * * * *